US009057738B1

(12) United States Patent
Sterling et al.

(10) Patent No.: US 9,057,738 B1
(45) Date of Patent: Jun. 16, 2015

(54) INERTIAL DYNAMICS MEASUREMENT AND STRUCTURAL CONFIGURATION VARIATION FOR HYDRODYNAMIC STABILITY EVALUATION OF A TOWED BODY

(71) Applicants: John A. Sterling, McLean, VA (US); Michael George Hanback, Bethesda, MD (US); Stephen Paul Ebner, Silver Spring, MD (US); Daniel Richard Nashold, Bristol, RI (US); Paul Michael Strano, Fairfax, VA (US); David Marcus Pickett, Selbyville, DE (US); Dana Carl Colegrove, Fairfax, VA (US)

(72) Inventors: John A. Sterling, McLean, VA (US); Michael George Hanback, Bethesda, MD (US); Stephen Paul Ebner, Silver Spring, MD (US); Daniel Richard Nashold, Bristol, RI (US); Paul Michael Strano, Fairfax, VA (US); David Marcus Pickett, Selbyville, DE (US); Dana Carl Colegrove, Fairfax, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 336 days.

(21) Appl. No.: 13/667,833

(22) Filed: Nov. 2, 2012

(51) Int. Cl.
*G01P 15/02* (2013.01)

(52) U.S. Cl.
CPC .................................... *G01P 15/02* (2013.01)

(58) Field of Classification Search
CPC ............ G01S 3/80; G01P 15/00; G01P 15/02
See application file for complete search history.

(56) References Cited

U.S. PATENT DOCUMENTS

| | | | | |
|---|---|---|---|---|
| 5,784,337 | A * | 7/1998 | Rainey et al. | 367/131 |
| 6,111,817 | A * | 8/2000 | Teeter | 367/13 |
| 7,085,637 | B2 | 8/2006 | Breed et al. | |
| 7,587,277 | B1 | 9/2009 | Wells | |
| 2009/0211509 | A1 | 8/2009 | Olivier et al. | |
| 2010/0265800 | A1 * | 10/2010 | Eatwell | 367/127 |

OTHER PUBLICATIONS

D.E. Calkins, "A Steady-State and Hydroelastic Analysis of Towed Line Arrays for ASW Target Applications," Applied Physics Laboratory, University of Washington, 1983.*
R. Colin Johnson, "IMU Integrates Accelerometer, Gyro," http://www.eetimes.com/General/PrintView/4373807, Electronic Engineering Times (EE Times), accessed online Aug. 10, 2012 (2 pages).
Alessandro Barbagelata et al, "Thirty Years of Towed Arrays," Oceanography, vol. 21, No. 2, Oceanography Society, pp. 24-33, Jun. 2008.

* cited by examiner

*Primary Examiner* — Helen Kwok
(74) *Attorney, Agent, or Firm* — Howard Kaiser (57) ABSTRACT

A typical inventive device is self-contained and is designed for adjunctive placement at the unconnected end of a towed body in order to test dynamic motions of the towed body. The inventive device includes an IMU, a computer, wired/wireless communication electronics, a fluid-dynamically shaped member, and a cylindrical housing (which encloses the IMU, the computer, and the communication electronics). The housing is connected to the towed body aft of the towed body, and the shaped member is connected to the housing aft of the housing. Data is acquired that is indicative of the inertial dynamics of the towed body while in motion through a fluidic medium. Differently shaped members can be independently connected to the housing at different times, each influencing in its own way the inertial dynamics of the towed body and yielding its own set of data. Comparisons can thus be drawn between/among differently shaped members.

20 Claims, 7 Drawing Sheets

INERTIAL DYNAMICS MEASUREMENT AND STRUCTURAL CONFIGURATION VARIATION FOR HYDRODYNAMIC STABILITY EVALUATION OF A TOWED BODY

BACKGROUND OF THE INVENTION

The present invention relates to towing, on or in water, of bodies such as sensor arrays, more particularly to evaluation of towed sensor arrays in terms of their dynamic motions that affect or may affect the sensing performed by the sensor arrays.

Many naval vessels such as ships and submersibles have connected thereto a lengthy sensing apparatus containing an array of sensors (e.g., hydrophones). During navigation the vessel tows the sensor array via a long cable. The sensor array usually trails behind the vessel at a sufficient distance to avoid disruptive factors (turbulence, noise, vibration, etc.) that are associated with the propulsion of the vessel. According to some sensor array designs, the sensors are housed in a tow vehicle, such as an elastomeric (e.g., rubber) hose, having a tow cable attached at the front end. Hydrophones, for instance, can be implemented inside the tow vehicle of a sonar array to transmit signals that can be processed to detect and characterize sound sources in terms of distance, direction, and acoustic signature.

In order to operate adequately or optimally, unwanted dynamic motions of a sensor array must be reduced or eliminated. The inertial dynamics of a sensor array may interfere with the accuracy of the sensor data and/or the stability of the system voltage. It is desirable to devise an effective, efficient, and economical methodology for identifying and attenuating dynamic motions of a sensor array that are deleterious to its functionality.

SUMMARY OF THE INVENTION

In view of the foregoing, it is an object of the present invention to provide method and apparatus for measuring inertial dynamics (synonymously referred to herein as "dynamic motions") of a towed body such as a sensor array towed by a marine vessel.

Another object of the present invention is to provide method and apparatus for evaluating the hydrodynamic shape of a towed body such as a sensor array, to determine how the shape affects the dynamic motions of the towed body.

Another object of the present invention is to provide method and apparatus for selecting, among various hydrodynamic shapes of a towed body such as a sensor array), the superior or optimal shape or shapes for purposes of mitigating the dynamic motions of the towed body.

A typical embodiment of the present invention is as a dynamic motion testing apparatus for a towed body. The inventive apparatus includes an inertial dynamics measurement device and a configurative structure. The inertial dynamics measurement device is capable of attachment to an elongate towed body at the aft longitudinal end of the towed body. The configurative structure is capable of attachment to the inertial dynamics measurement device at the aft longitudinal end of the inertial dynamics measurement device. The inertial dynamics measurement device includes an inertial measurement unit for obtaining inertial dynamics data pertaining to the towed body during motion of the towed body while the inertial dynamics measurement device is attached to the towed body and the configurative structure is attached to the inertial dynamics measurement device.

According to typical inventive practice, the inertial dynamics measurement device includes an at least substantially cylindrical housing, an onboard computer for collecting inertial measurement data, and at least one communication device (wired and/or wireless) for transmitting the inertial measurement data from the onboard computer to an off-board computer. The housing encloses the inertial measurement unit, the onboard computer, and the at least one communication device. The towed body and the apparatus are each characterized by a geometric longitudinal axis. During the motion of the towed body, the apparatus is coaxially coupled with the towed body.

Frequent inventive practice provides for inclusion by the inventive apparatus of at least two separate, differently shaped, configurative structures. Each configurative structure represents an alternative attachment to the inertial dynamics measurement device, and is uniquely capable of affecting the inertial dynamics of the towed body during motion of the towed body. The inertial measurement unit is capable of obtaining a set of inertial dynamics data corresponding to each configurative structure during motion of the towed body while the inertial dynamics measurement device is attached to the towed body and the configurative structure is attached to the inertial dynamics measurement device. The inventive practitioner can compare the various configurative structures by comparing the corresponding sets of inertial dynamics data.

Typical practice of the present invention involves evaluation of various hydrodynamic geometries of a sensor array, thereby determining the most effective geometry or geometries for purposes of attenuating deleterious inertial dynamics of the sensor array. The evaluation includes measurement of inertial dynamics of the sensor array with respect to each of various geometries, and further includes comparison of the corresponding inertial dynamics exhibited by the various geometries. An inventive device is connected at the back end of a towed body and is characterized by a geometry that affects the fluid dynamics of the towed body while the towed body moves through a fluid medium. Different inventive devices can be connected to the towed body that are characterized by different geometries, thus providing a basis for comparing the different geometries and assessing which geometry or geometries are better or best in terms of the inertial dynamics of the towed body.

The present invention is typically embodied as an adjunctive hydrodynamic-stability testing device that is self-contained and that is capable of being coaxially coupled with a linear sensor array at the back end of the sensor array. The inventive hydrodynamic-stability testing device includes a conventional inertial measurement unit (IMU) and is capable of measuring inertial dynamics of the sensor array. Many commercially available IMUs are suitable for inventive practice. The inventive device performs onboard data collection/acquisition, measuring inertial dynamics of a towed body and recording dynamic responses of the system. Typically, hydrodynamic reactions in any part of the towed array can be recorded by the inventive device.

Although the examples described herein emphasize a marine environment, it is to be understood that inventive practice is not limited to water-surface or underwater applications. The major principles of the present invention are applicable to a variety of towed sensor arrays, in water, air, and/or land environments. For instance, ground and air applications may address aerodynamic concerns analogously as water applications address hydrodynamic concerns.

The present invention provides a hydrodynamic-stability testing device for use in association with a towed body such as a towed sensor array. Featured by the inventive device is its integration of a sensory component and a configurative component. A typical embodiment of an inventive device combines (i) sensing capability of dynamic motion, and (ii) variability of structural configuration. The sensing of dynamic motion is performed via electronics that are inside a substantially cylindrical housing. The variation of structural configuration is performed via interchangeability of variously shaped members that are attachable to the substantially cylindrical housing at its axial-longitudinal back end. As typically embodied, the inventive device includes (i) a dynamic-motion measurement component, and (ii) a structural configuration variation component.

The "inertial dynamics measurement component" (synonymously referred to herein as the "dynamic-motion sensing component") is the first of two main components of typical inventive practice. The inertial dynamics measurement component includes IMU instrumentation having different sensors for sensing different inertial dynamics phenomena. Typically, the inertial dynamics measurement component is self-powered and self-contained, and has a waterproof housing. The housing not only serves as a protective enclosure for the internal electronic components, but is also modular in nature. The inertial dynamics measurement component is suitably configured for coaxial attachment, in a minimally invasive or noninvasive manner, to the aft structure of a particular linear array. The housing typically is rigid and water-sealed to protect the internal electronics, and is generally cylindrical in shape to conform to the generally cylindrical shape of a linear sensor array.

Contained within the inertial dynamics measurement component's housing are an IMU, a computer (having a processor and a memory), a power supply (e.g., one or more batteries), and wired communication instrumentation (e.g., SEACON technology) and/or wireless communication instrumentation (e.g., BLUETOOTH technology). There are basically two varieties of conventional IMUs. A first basic design of a conventional IMU combines two sensor elements, viz., a three-axis accelerometer, and a three-axis gyroscope. A second basic design of an IMU combines three sensor elements, viz., a three-axis accelerometer, a three-axis gyroscope, and a three-axis magnetometer. The second basic IMU design (i.e., an IMU having an accelerometer, a gyroscope, and a magnetometer) is preferable for many applications of the present invention.

The structural configuration variation component is the second main component of typical inventive practice. The structural configuration variation component, also referred to herein as the "end-cap," is attachable to and detachable from the device's housing at the aft end of the housing. The inventive practitioner can test different hydrodynamic shapes of the removable end-cap under various marine conditions. In typical inventive testing, each end-cap is attached to the back end of the dynamic-motion sensing component's housing; the front end of the dynamic-motion sensing component's housing remains attached to the back end of the linear sensor array.

The present inventors investigated the towing of sensor arrays implemented in a conventional manner, that is, sans the present invention's hydrodynamic-stability testing device. The conclusion reached by the present inventors was that the observed sensor errors and voltage fluctuations were attributable to "wagging of the tail," so to speak, of the sensor-array-containing flexible hose. The wagging (e.g., back-and-forth vibratory motion) at the aft extreme of the flexible sensor array was believed by the present inventors to be causing the detected performance anomalies of the towed arrays. Typical implementation of the present invention's hydrodynamic-stability testing device squarely confronts the wagging problem detected at the back end of the sensor array during its towing by a marine vessel.

In accordance with typical practice of the present invention, differently shaped end-caps can be tested and selected to suit different hydrodynamic purposes. For instance, each end-cap can be hydrodynamically tailored for a desired speed of towing. The respective degrees of stability and noise can affect the performance of the towed array. The dynamic-motion sensing component can continuously monitor the stability and noise of the towed array during the towing. The acquired IMU data can be used to find the best end-cap configuration(s) to minimize vibration.

In essence, the present invention's hydrodynamic-stability testing device represents a kind of attitude and heading reference system (AHRS) insofar as it joins an IMU together with processing capability with respect to the IMU data. A number of IMU products are manufactured and commercially available. Typically, the IMU suitable for inventive practice of the inertial dynamics measurement component is: small and lightweight; fully temperature compensated over an entire operational range (e.g., −40° to +75° C.); calibrated for sensor misalignment, gyro G-sensitivity, and gyro scale factor non-linearity; outputs signals indicative of Euler angles, rotation matrix, Δ angle, Δ velocity, acceleration, angular rate, and magnetic field.

BRIEF DESCRIPTION OF THE DRAWINGS

The present invention will now be described, by way of example, with reference to the accompanying drawings, wherein.

DESCRIPTION OF EXEMPLARY
EMBODIMENTS OF THE INVENTION

Figure 1:
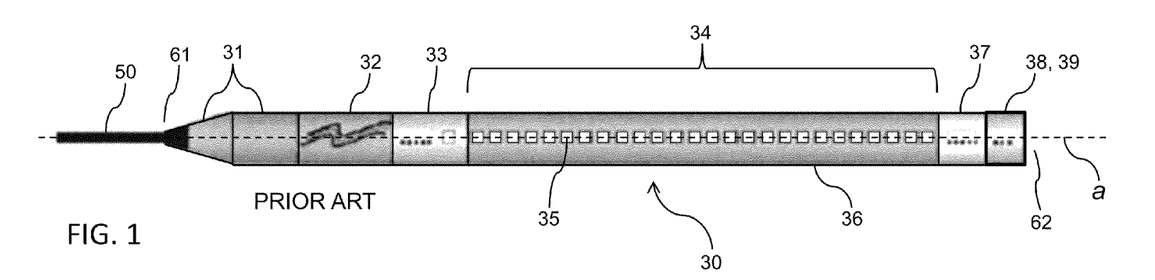
FIG. 1 is a longitudinal elevation view of a representative towed elongate body suitable for inventive practice.

Referring now to FIG. 1, conventional towed array 30 includes a nosecone assembly 31, a vibration isolation module 32, a forward interface mount 33, an acoustic module 34 (including an array of hydrophones 35 and an elastomeric hose-like enclosure 36 for the hydrophones 35), an aft sensor module 37, a wideband device 38, and a bulkhead 39 (enclosing wideband device 38). The nosecone assembly 31 is located at the front end 61 of the towed array 30. The wideband 38 is located at the back end 62 of the towed array. Towed array 30 is connected at its front end 61 via a lightweight tow cable 50 (a short segment of which is shown) to a marine vessel such as a ship or a submersible.

Figure 2:
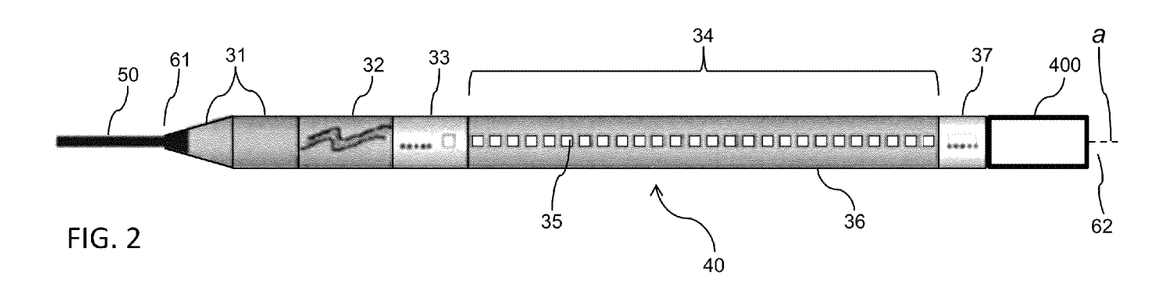
FIG. 2 is a view similar to the view of FIG. 1, modified to illustrate addition of an inventive apparatus at the back end of the towed elongate body shown in FIG. 1. Frequent inventive practice provides for concomitant removal of an existing electronic device at the back end of the original towed body.
Figure 3:
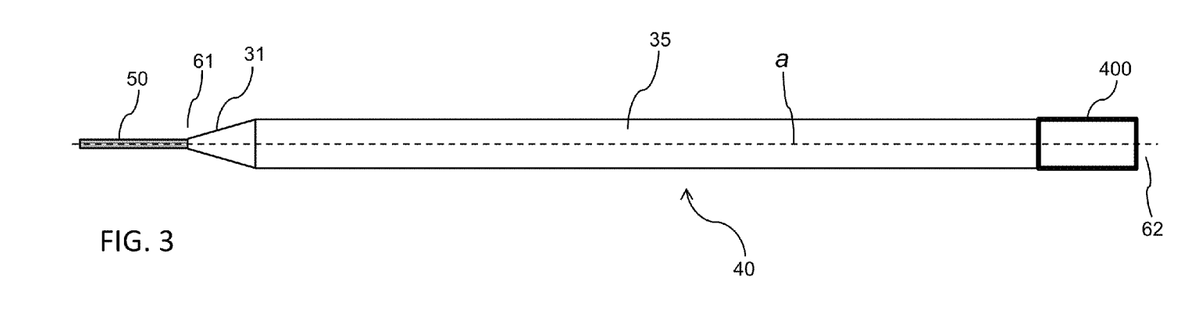
FIG. 3 is a view similar to the views of FIG. 1 and FIG. 2, generalized to conceptually illustrate placement of an inventive apparatus at the back end of an elongate towed body.

With reference to FIGS. 2 and 3, conventional towed array 30 can be modified to become inventive towed array 40. As shown in FIG. 2, the wideband device 38 has been removed from the back end 62, and has been replaced at the back end 62 with the present invention's hydrodynamic stability testing unit 400. FIG. 3 more generally illustrates how typical inventive practice provides for attachment of an inventive hydrodynamic stability testing unit 400 at the extreme axial-longitudinal back end 62 of a conventional towed array 30. Acoustic modes 34 in actual application will typically be significantly longer than shown dimensioned for illustrative purposes in FIGS. 1-3. The towed arrays 30 and 40 shown in FIGS. 1-3 are each characterized by the same geometric longitudinal axis a.

Figure 4:
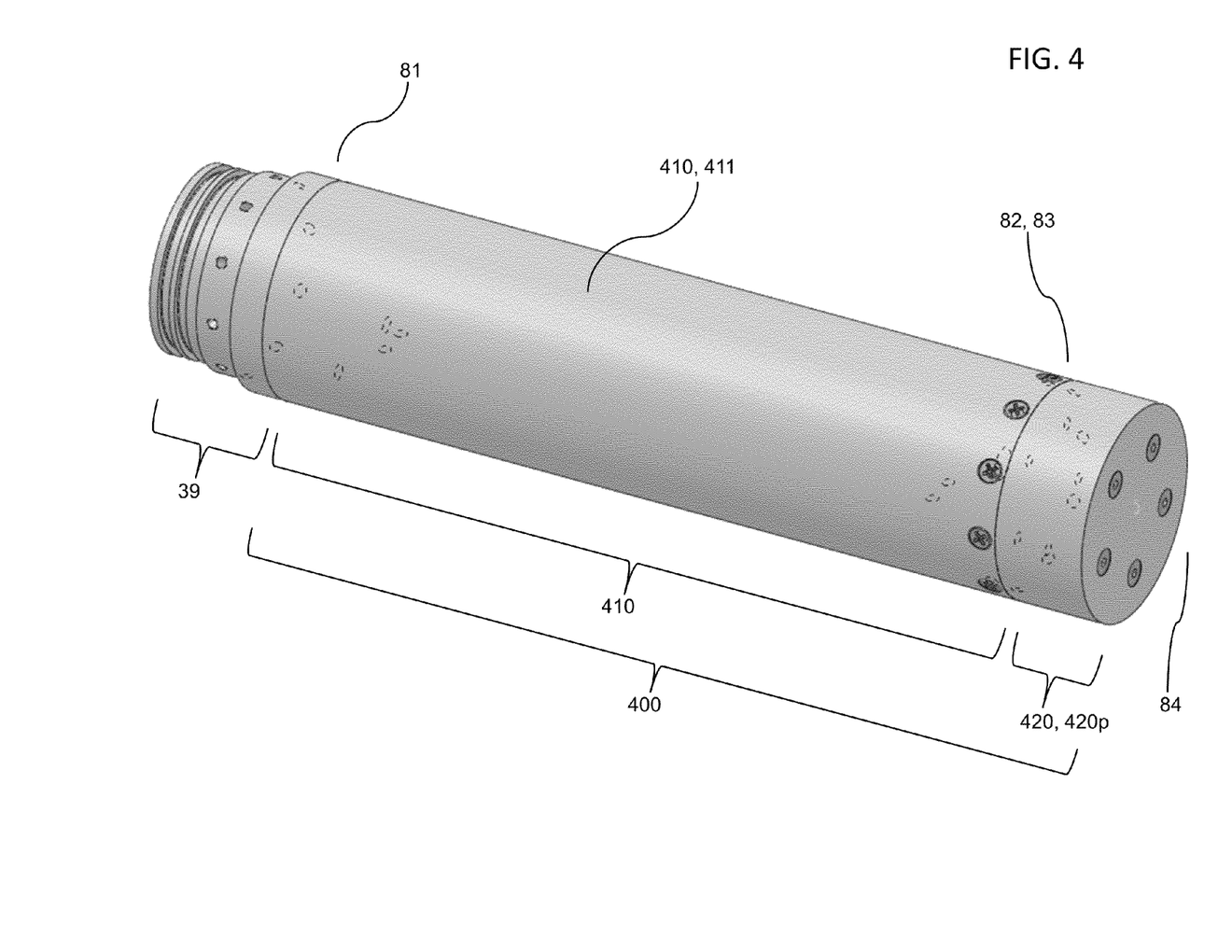
FIG. 4 is a perspective view of an embodiment of a dynamics measurement and configuration variation apparatus in accordance with the present invention. The inventive apparatus is shown to have a short cylindrical (e.g., disk-shaped) end-cap.
Figure 5:
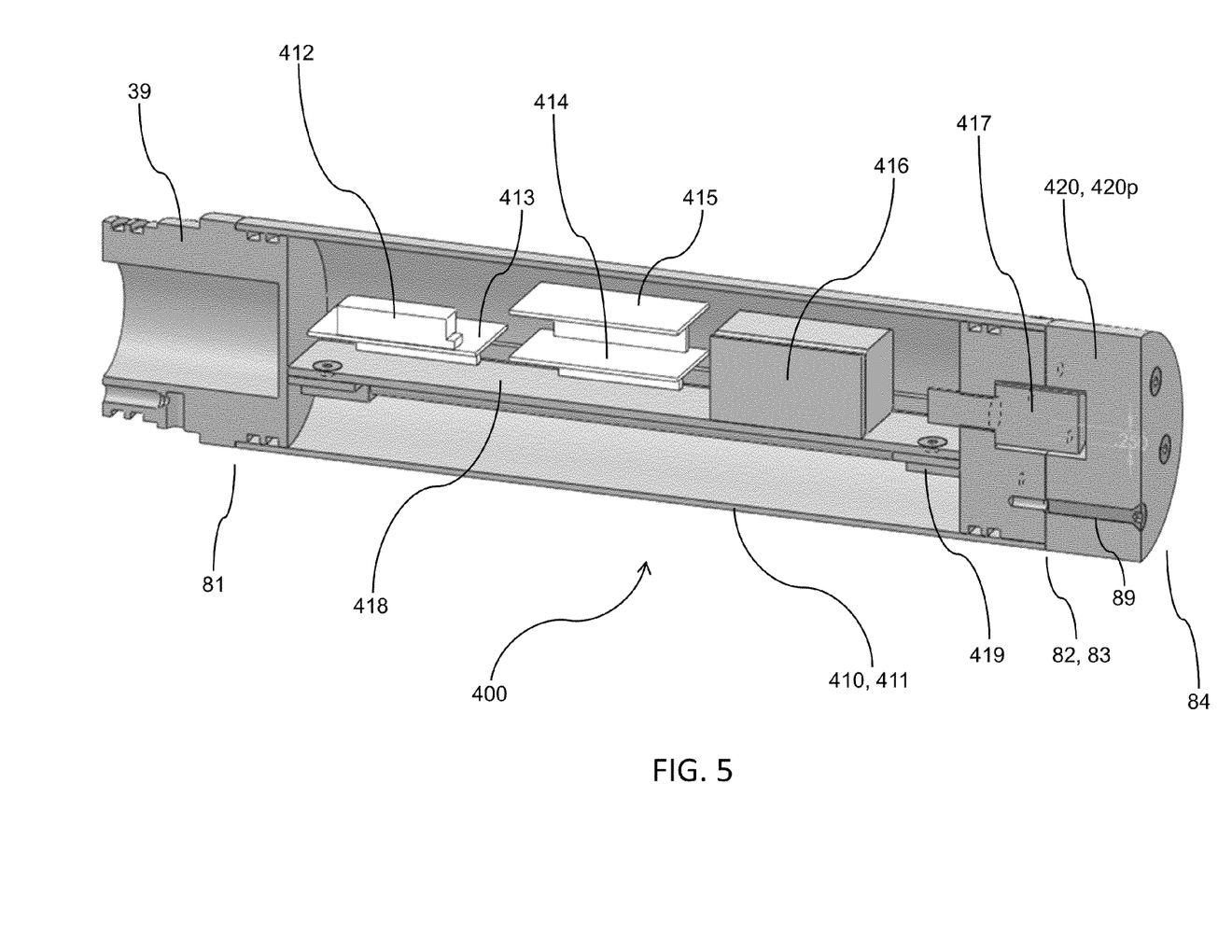
FIG. 5 is a perspective view of the inventive embodiment shown in FIG. 4, sectioned in a direction through the longitudinal axis to reveal some interior detail.
Figure 6:
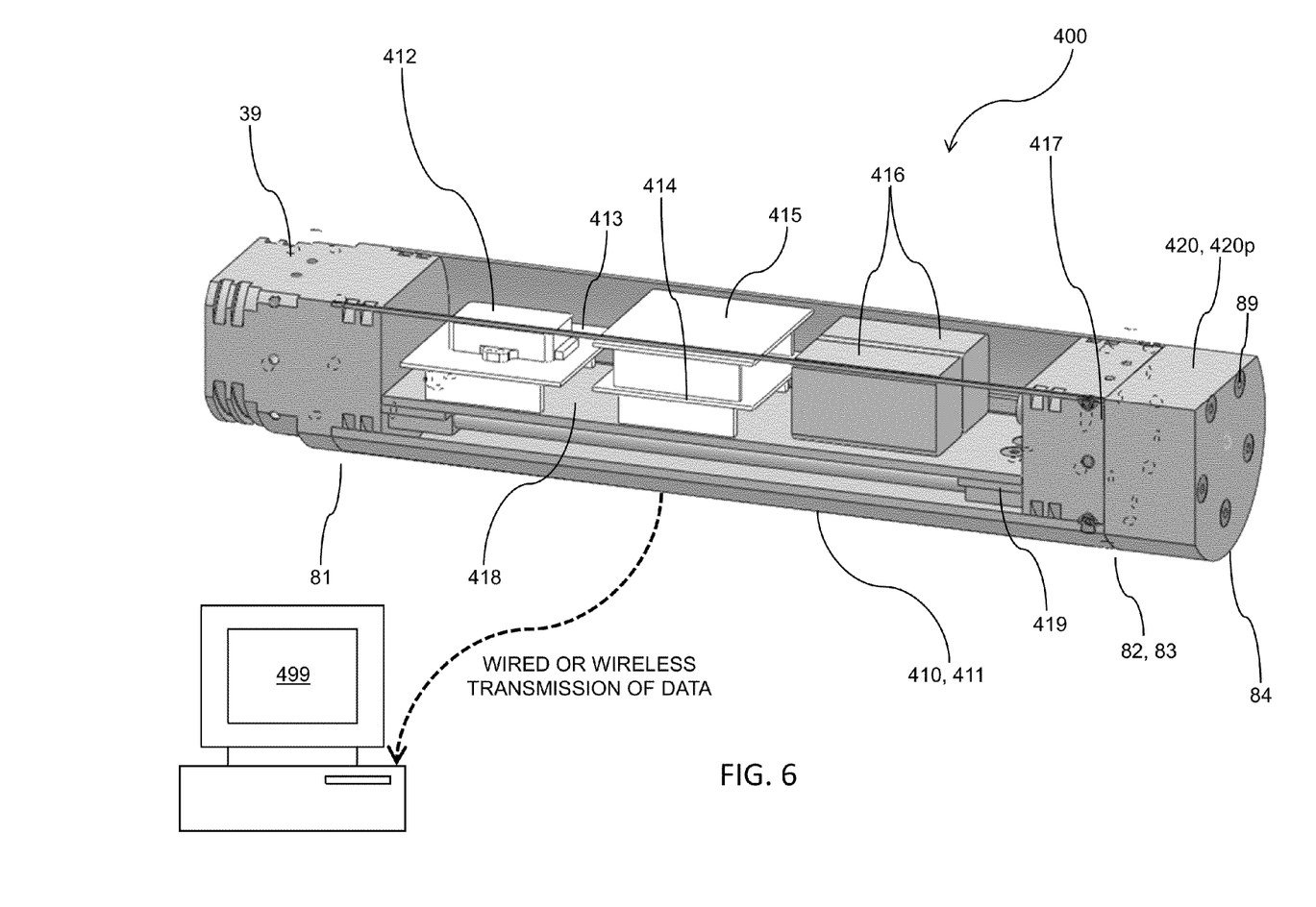
FIG. 6 is a different perspective view of the inventive embodiment shown in FIG. 4, sectioned in two directions along the longitudinal axis to reveal some interior detail.

With reference to FIGS. 4 through 6, inventive hydrodynamic stability testing unit 400 includes an inertial dynamics measurement component 410 and a structural configuration variation component 420. The inertial dynamics measurement component is synonymously referred to herein as the "IMU measurement component" and the "IMU data can." The inventive inertial dynamics measurement component 410 has a front end 81 (which joins the back end 62 of the conventional sensor array 30) and a back end 82 (which joins the front end 83 of the structural configuration variation component 420). Depending on the inventive embodiment, the coupling of the inventive unit 400 with a conventional towed array 30 can be accomplished either with or without removal of a portion of the original construction at the back end of the conventional towed array 30.

FIGS. 4-6 illustrate replacement of the wideband device and coaxially mounting of the inventive unit 400 outside a backmost portion of the bulkhead 39 at the back end of the towed array. The inventive unit 400 is typically of such size and weight that it can be attached (e.g., affixed) either to the back end surface of a towed body, or attached (e.g., bolted) more internally to a structure (e.g., bulkhead) at the back end of a towed body. The attachment of inventive unit 400 is typically accomplished so as not to affect the dynamics of the towed array system, and so as not to require any hookup to existing telemetry.

Inertial dynamics measurement component 410 includes a cylindrical or substantially cylindrical housing 411 (for enclosing the electronics, and for attaching at the rear of the conventional towed array 30), an inertial measurement unit (IMU) 412, a power board 413 (upon which the IMU sits), a computer (e.g., including a CPU or microprocessor and a flash memory storage card) 414, wireless communications instrumentation (e.g., a BLUETOOTH antenna/transmitter) 415, a direct current power supply (e.g., one or more batteries) 416, wired communications instrumentation (e.g., a SEACON connector) 417, and a shelf 418 along with shelf supports 419 for supporting the IMU 412 and other internal electronics.

Housing 411 is cylindrical, rigid (e.g., metallic), and hollow, reminiscent of a "can." During inventive testing, the present inventors referred to IMU measurement component 410 as an "IMU data can" or an "IMU can." A typical housing 411 of an inventive inertial dynamics measurement component 410 is strong and lightweight, for instance made of anodized aluminum. The dc power supply (e.g., one or more batteries) 416 typically is rechargeable. It may be preferable for some inventive applications to provide for both wired data extraction (e.g., SEACON fiber-optic connection) 417 and wireless data extraction (e.g., BLUETOOTH wireless communication) 415. Typical run times of inventive testing of towed bodies, in or on water, are several or many (e.g., 20) hours.

The IMU can implement a custom interface to store the data from the IMU output on the flash card, and can have an adjustable sampling rate. Given the size of the memory card and the available battery power, the inventive unit 400 can be embodied for use for long periods of testing without requiring maintenance, or for having data retrieved effortlessly as desired, such as by using a custom dongle and switch that connects to the computer and is transferred when the switch is thrown.

FIGS. 4-6 show an end-cap 420 (i.e., a structural configuration component 420) that is a "plain" cylindrical end-cap 420p. Also referring to FIGS. 7 through 10, typical inventive practice provides for interchangeability of variously configured end-caps 420. Viable alternatives to the cylindrical design of end-cap 420p include a concaved cylindrical end-cap 420c (shown, with two different depths d of concavity, in FIGS. 7 and 8), a finned conical end-cap 420f (shown in FIG. 9), and a wheeled conical end-cap 420w (shown in FIG. 10).

It is to be understood that the end-caps 420 shown herein are by way of example and not of limitation. Any of multifarious shapes of end-cap 420 are possible in inventive practice, including those characterized by foils, wings, fins, flaps, spoilers, wheels, etc. The skilled artisan who reads this disclosure will appreciate a variety of configurative choices that are possible for an end-cap in inventive practice.

Figure 7:
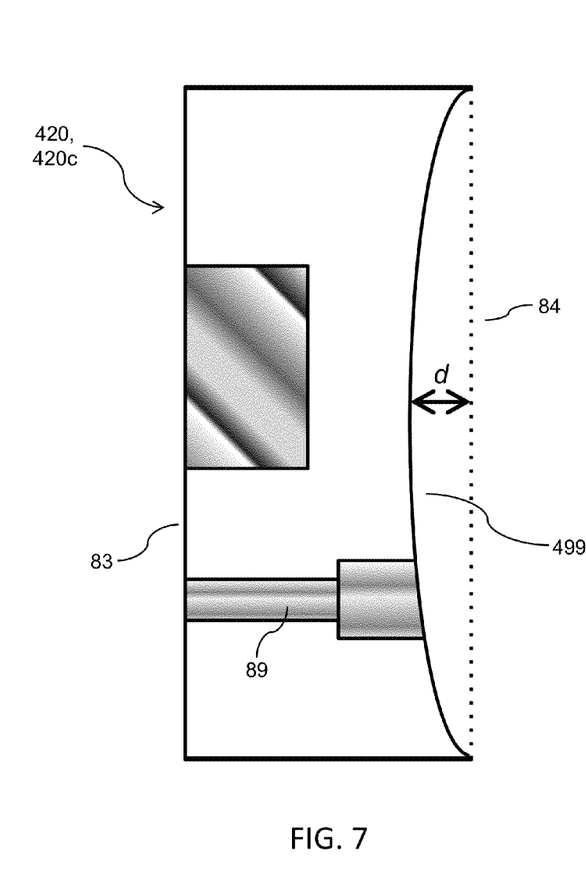
FIGS. 7 and 8 are two different embodiments of a concave end-cap suitable for replacing the cylindrical end-cap shown in FIG. 4, in accordance with the present invention. The end-cap shown in FIG. 8 has a greater depth of concavity than has the end-cap shown in FIG. 7.
Figure 8:
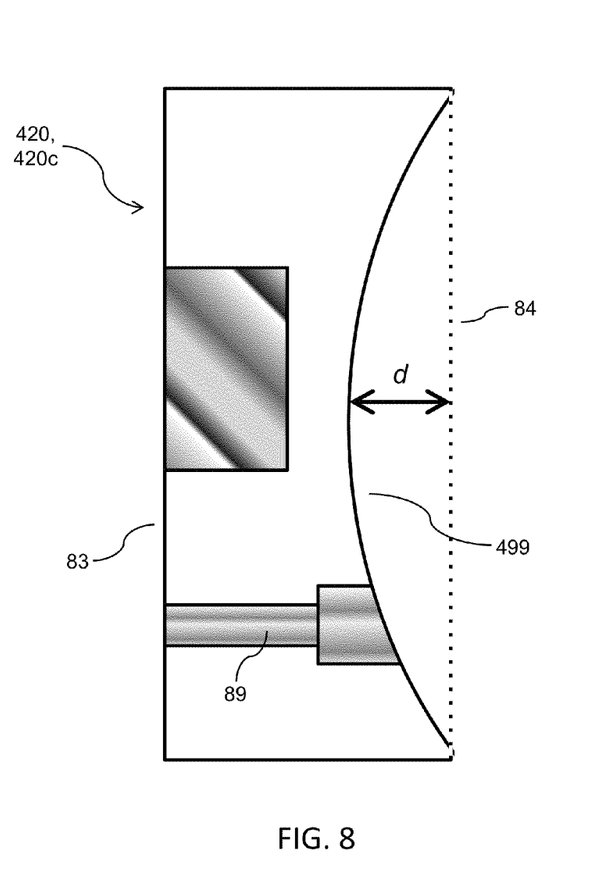
Figure 9:
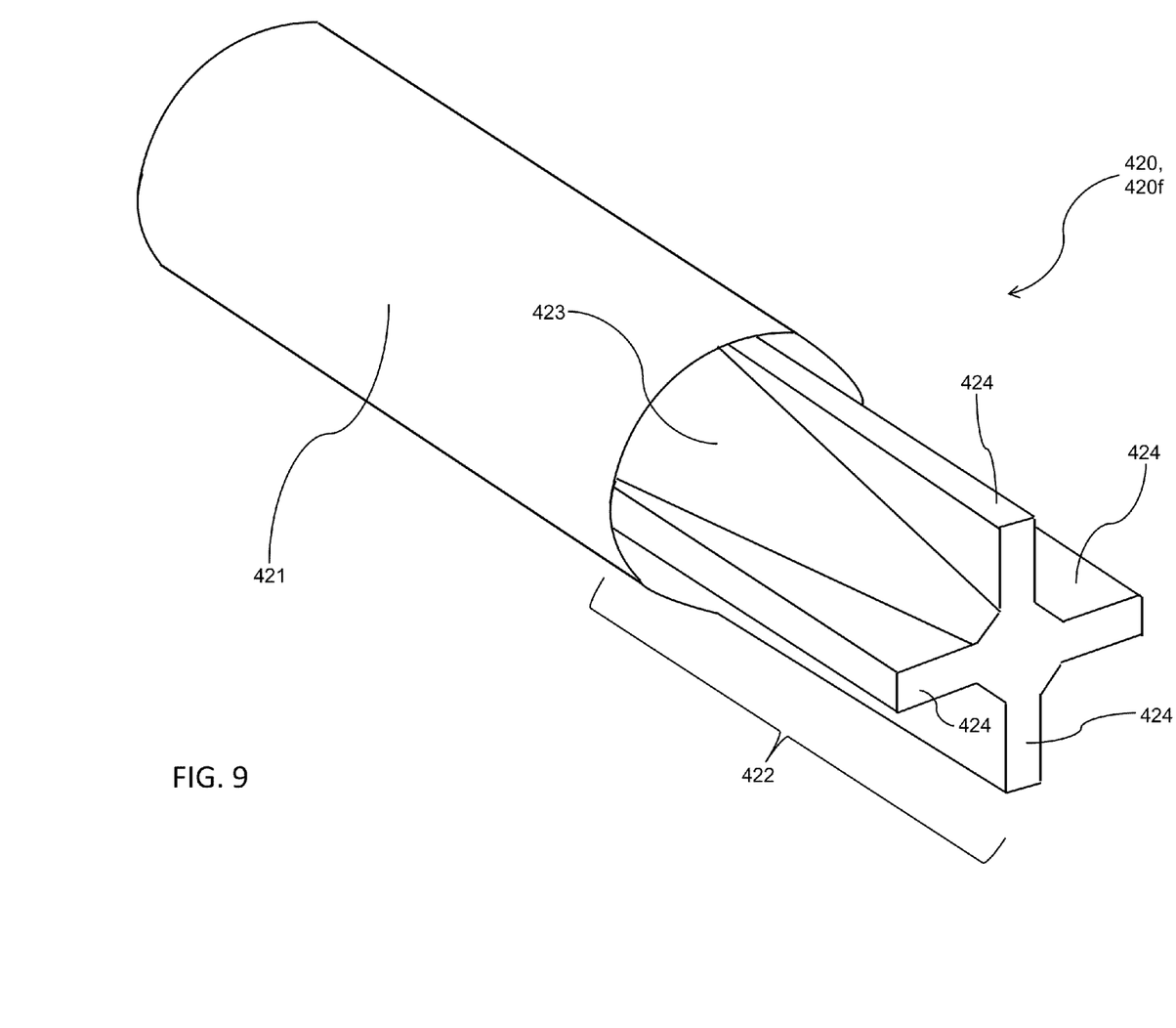
FIG. 9 is an embodiment of a plural-fin-type end-cap suitable for replacing the cylindrical end-cap shown in FIG. 4, in accordance with the present invention.
Figure 10:
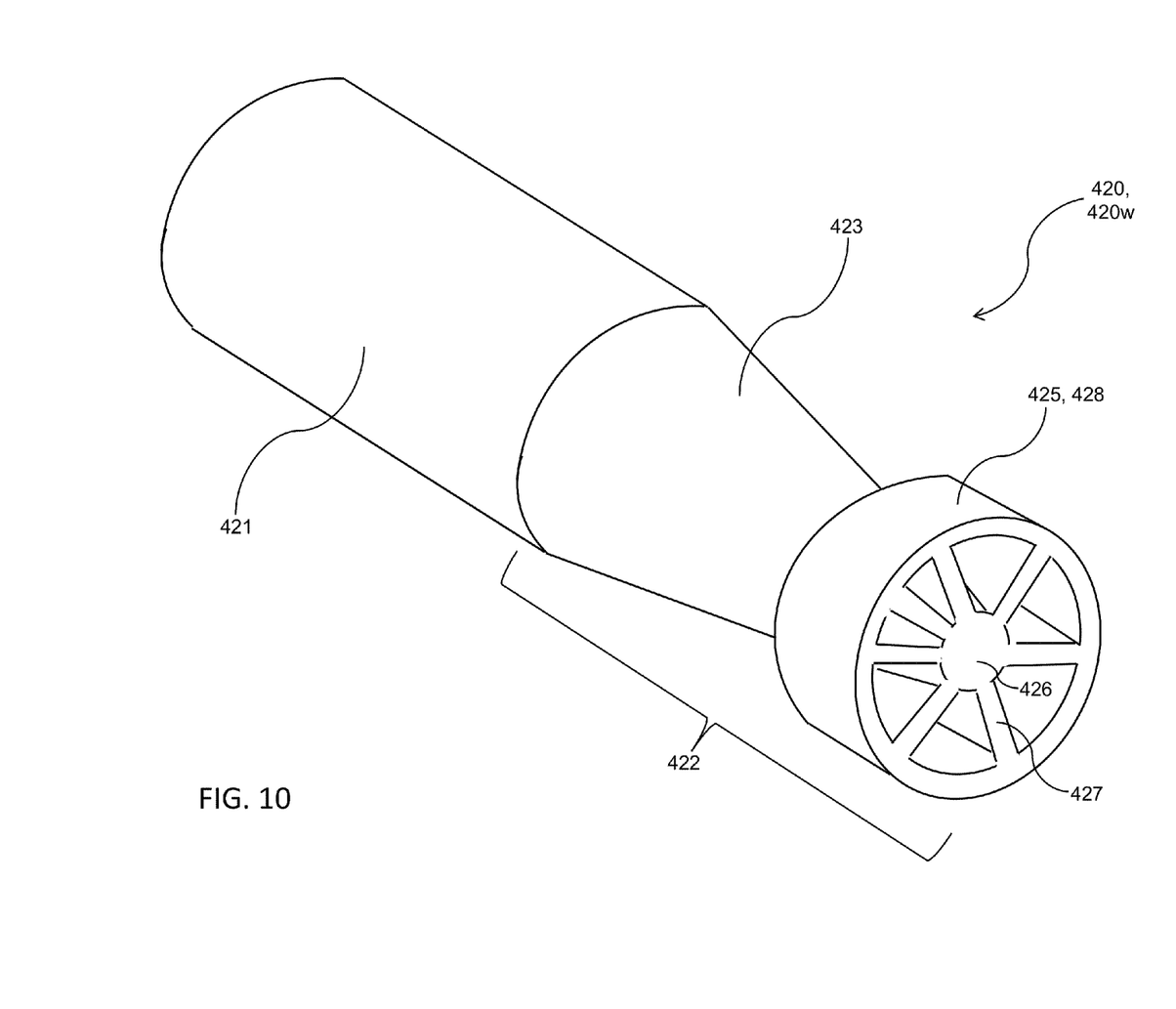
FIG. 10 is an embodiment of a wagon-wheel-type end-cap suitable for replacing the disk-shaped end-cap shown in FIG. 4, in accordance with the present invention.

Each end-cap 420—whether the "plain" cylindrical end-cap 410p shown in FIGS. 4-6, or the concaved end-cap 410c shown in FIGS. 7 and 8, or the finned end-cap 410f shown in FIG. 9, or the wheeled end-cap 410w shown in FIG. 10—is coaxial with the tow array, in particular with the IMU component 410. That is, the inertial dynamics component 410 and the end-cap component 420 are coaxial, each describing a geometric axis that is coincident with the geometric axis a described by the inventive towed array 40. Furthermore, each end-cap 420 depicted in FIGS. 4-10 is an axially symmetrical structure, and when coupled with the tow array is symmetrical about the tow array's longitudinal axis a.

A concaved cylindrical end-cap 420c, nearly cylindrical in shape, is characterized by a concavity 499, e.g., a circular and predominant indentation or depression, on the aft longitudinal-axial end of the end-cap. The concavity typically extends to or nearly to the periphery or circumference of the cylindrical end of the end-cap 420c. Concaved end-cap 420c shown in FIG. 8 to have a concavity 499 depth d (e.g., 0.5 inches) that is about twice the concavity 499 depth d (e.g., 0.25 inches) of the concaved end-cap 420c shown in FIG. 7.

A finned conical end-cap 420 has any number of longitudinal fins 424 lying in respective geometric planes that pass through geometric longitudinal axis a. End-cap 420f includes two coaxial sections, viz., a cylindrical section 421 and a hydrodynamically shaped section 422, which includes a truncated conical (frustum-shaped) section 423 having longitudinal axis a, and plural fins 424 projecting radially from section 423 and longitudinal axis a. Typically, the fins 424 are evenly distributed about axis a and define geometric planes in which axis a lies, as exemplified by the four fins 424 that are shown in FIG. 9 at right angles to axis a.

Like a finned conical end-cap 420, a wheeled conical end-cap 420 includes two coaxial sections, viz., a cylindrical section 421 and a hydrodynamically shaped section 422, which includes a truncated conical (frustum-shaped) section 423 and a wheel 425 fixed at the truncated end of section 423. Reminiscent of a wagon-wheel-shaped structure such as may be found as part of a torpedo, wheel 425 includes a rim 428, a hub portion 426 constituted by a truncated end portion of section 423, and plural spokes (e.g., six spokes evenly distributed about longitudinal axis a, such as shown in FIG. 10). Hub portion 426 and rim 428 share longitudinal axis a, and spokes 427 project radially from longitudinal axis a.

The present inventors conducted multiple tow tests of their invention. IMU data was collected that was indicative of the acceleration of the ASM in a dummy array. The data suggested a possible wagging motion at the aft end of the array. In conjunction with this testing, test video from divers showed that there was very little motion along the length of the array. Furthermore, the wideband omni (WBO) hydrophone exhibited some full-scale voltage transients, predominantly at higher speeds. The present inventors inferred that, due to the lack of tension at the aft end of the array, some amount of vibration and wag was occurring that resulted in erroneous aft heading sensor data and in WBO voltage transients.

The inventive testing was conducted using a "dummy" array in a tow basin, and towing the dummy array at various speeds in the tow basin. The dummy array's acoustic module 34 included the elastomeric hose 36, but did not include the sensors (e.g., acoustic sensors such as hydrophones) 35. Use of a Navy tow basin was efficient and cost-effective for obtaining the desired data. It was easier to install and remove the array end caps when the array was deployed in a tow basin, than if the array had been deployed behind a boat in open water. Moreover, the tow basin's photo pit provided clear contrast for video footage without the need for divers.

The present inventors sought to determine the extent to which the aft end of the array was wagging, and whether the wagging or any other vibration was the cause of the erroneous aft heading sensor data and WBO transients. The present inventors also sought to obtain visual data (video and photo) of the array motion while towing at the speeds of 5, 10, 15, and 20 knots. Further, the present inventors sought to obtain ASM acceleration data from the IMU for various end-cap configurations, using differently shaped end-caps installed on the aft end of the ASM, thereby determining the effects of the end-caps on acceleration at speeds of 5, 10, 15, and 20 knots.

In furtherance of these objectives, the present inventors installed an inventive hydrodynamic stability testing unit 400 on the aft end of the ASM, in place of the wideband assembly. The towing array was towed across the basin at speeds of 5, 10, 15, and 20 knots. The data from the IMU was downloaded and analyzed, looking for any wagging motion at the WBO. Wagging was expected to appear as a sinusoidal curve in the acceleration data, somewhere between 5 and 1000 Hz. The majority of the energy was expected to fall between 10 and 150 Hz.

The IMU data for each hydrodynamic end-cap design was compared to the baseline (cylindrical) end-cap design, thereby measuring the effectiveness of the different end-cap designs. To make judgments regarding WBO wagging, linear and angular accelerations were sampled as close to 1000 Hz as practical. Any additional orientation data was considered helpful to compare the performance of the different end caps. This inertial dynamics measurement component 410 was designed to be light (weighing about 5.6 lbs in air, and about 1.24 lbs in water) and robust, and to operate accurately in a harsh vibratory environment with sensors being sampled at 30 kHz. Component 410 measured six degrees of freedom, along with rates and Euler angles.

All of the data was recorded by the inertial dynamics measurement component 410 embodied as shown in FIGS. 4-6, which the present inventors designed specifically for this testing. Component 410 measured and stored all of the required data, which was subsequently downloaded to an off-board computer 499 periodically throughout the day and after the last run of the day. Periodic monitoring of data provided feedback to determine if any adjustments or repeat runs were necessary. The sampling rate was set to 1000 Hz to cover the entire predicted range of significant data. The critical channels were the delta velocity and delta angle channels. Non-critical channels included Euler angles, rotation matrix, acceleration angular rate, magnetic field, speed, and cable angle.

Prior to installing the present invention's measurement component 410 on the ASM 37, the wideband assembly 38 was removed. The wideband assembly, though important in normal acoustic sensing operation by a tow array, was considered by the present inventors to be superfluous to their testing of inertial dynamics, and to thus be dispensable in order to facilitate coupling of the inventive test unit with the tow array. The sensors 35 were similarly considered to be unrequired in the testing. The diameter of the ASM 37 was measured in three places, viz., forward, middle, and aft. Some ISOPAR was drained out of the ASM 37 such that the ASM 37 was no longer over-pressurized. The wideband assembly, connected at the back of the ASM, was removed from ASM. The measurement component 410 was installed on the aft end of the ASM, using new o-rings and ten coupling screws. The ASM was filled with ISOPAR to the same module diameter as before removal of the wideband assembly.

The array was shipped with the AM and the VIM coupled on the elastomeric hose 36 reel, and with the nosecone 31 (together with the tow cable 50), the ASM 37, and the FIM 33 in separate containers. Before towing the array, the modules were assembled as shown in FIG. 1, appropriately using O-rings at couplings. The modules were pre-ballasted and did not require additional L ISOPAR L. A carriage associated with the tow basin was used to tow the tow array. Every day before testing, the carriage was calibrated. The measurement component 410 was powered on, calibrated, and attached to the ASM 37. With the measurement component 410 in place, the array was towed west-to-east at speeds of 5, 10, 15, and 20 knots, to obtain baseline readings for ASM movement. These runs were repeated with each end-cap 420 to test the effectiveness of the different end-cap designs.

A set of data runs (5, 10, 15, 20 knots) was performed on each end-cap 420. At the beginning of a new set, the old end-cap was changed out by removing the five screws 89 from the back of the measurement component 410. The new end-cap 420 was put into place, and the five screws 89 were replaced. Before each run, the speed instrumentation on the carriage was zeroed. Each run was begun slowly, speeding up to the test speed once the array was fully under tension. The carriage was decelerated slowly as the opposite (east) end of the basin approached.

After completing a data run, in order to return to the west end of the basin, the tow cable and nosecone were disconnected from the strut. Floats were attached to the array to keep the array at the surface. A rope was attached to the end of the ASM, and was used to tow the array backwards, from the east end to the west end. The nosecone was placed over the forward pulley of an array handler, and the array was lifted out of the water, feeding it over the aft pulley. The carriage was driven backwards with a team inside moving the array over the pulleys and attaching additional floats to the array about every 50 feet. Once the carriage reached the aft end of the array, a rope was secured to the back of the ASM with half-hitch knots, and was tied to the carriage.

The array was towed in reverse to the west end of the basin at 5 knots or less. When the carriage reached the west end of the basin, the end-cap was either kept the same or changed out, depending on the test plan. The ASM was untied and dropped into the water. The carriage was driven forward over the top of the array while removing the floats. The carriage was stopped over the nosecone, and the tow cable was attached to the strut. The array was ready for forward towing.

Once testing for a day was complete, the IMU measurement component 410 was removed to download data and to recharge the batteries. To avoid draining and refilling of the ASM while coupled to the array in the carriage, the ASM was disconnected from the AM, and the inventive unit 400 was brought to the IMU charging station. A seal cap was installed on the exposed bulkheads of the AM and the ASM. The aft end of the AM was tied off to the carriage so that it did not sit uncoupled at the bottom of the basin overnight. The IMU data was downloaded, and the batteries were charged. The IMU component was disconnected from the ASM essentially by reversing the afore-described procedure for connecting the IMU component to the ASM.

After all of the testing was completed, the array was removed from the basin. The nosecone, the FIM, and the ASM were disconnected and packed. The AM and the VIM were coupled and loaded onto the reel. After the last run was finished, the array was reverse-towed, back to the east end of the tow basin. The ASM was untied and lifted out of the tow basin. Again, the IMU measurement component 410 was removed from the ASM 37 by reversing the procedure for joining the IMU measurement component 410 to the ASM 37. The ASM 37 was then decoupled from the AM hose 36, capping off all exposed bulkheads. The AM was loaded onto the reel, and the eye on the seal cap was tied to the reel. The array was reeled in until the VIM was out of the tow basin. The ten coupling screws were removed from the VIM-FIM joint. The FIM was disconnected from the AM, along with the CV plugs. The FIM was removed, the ends of the FIM were capped off, and the FIM was placed in its own 11-feet-by-13-feet shipping container. The AM and VIM were coupled and reel in the rest of the way, onto the reel. The nosecone was removed from the VIM by removing the ten coupling screws and the CV plug.

In recording the data, a "run matrix" was devised for collecting and comparing inertial dynamics (IMU) data for each of six configurations, viz.: (i) a conventional tow array 30, such as shown in FIG. 1; (ii) an inventive tow array 40 having a cylindrical end-cap 420 such as shown in FIGS. 4-6; (iii) an inventive tow array having a concave cylindrical end-cap having a 0.25 inch depth of indentation, such as shown in FIG. 7; (iv) an inventive tow array having a concave cylindrical end-cap having a 0.5 inch depth of indentation, such as shown in FIG. 8; (v) an inventive tow array having a multi-fin end-cap, such as shown in FIG. 9; (vi) an inventive tow array having a spoked-wheel end-cap, such as shown in FIG. 10. Each configuration yielded a data set for all four towing speeds, viz., 5, 10, 15, and 20 knots. Other types of data, such as photo and video, were also collected.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A dynamic motion testing apparatus for a towed body, the apparatus comprising an inertial dynamics measurement device and a configurative structure, the towed body and the apparatus each being characterized by a longitudinal axis, the apparatus being capable of being coaxially coupled with the towed body whereby the inertial dynamics measurement device is coaxially attached to the towed body at the aft axial-longitudinal end of the towed body and the configurative structure is coaxially attached to the inertial dynamics measurement device at the aft axial-longitudinal end of the inertial dynamics measurement device, the inertial dynamics measurement device including an inertial measurement unit for obtaining inertial dynamics data pertaining to the towed body during motion of the towed body while the apparatus is coaxially coupled with the towed body, wherein the configurative structure is characterized by a shape selected from the group consisting of: a cylinder having an attachable axial-cylindrical end and a concave axial-cylindrical end; the combination including a truncated cone and plural axial fins projecting from the truncated cone; the combination including a truncated cone and a wheel having spokes projecting from the truncated cone at the truncated end of the truncated cone;

wherein if the configurative structure is characterized by the shape of the cylinder having an attachable axial-cylindrical end and a concave axial-cylindrical end, then the configurative structure is coaxially attached to the inertial dynamics measurement device at the attachable axial-cylindrical end of the cylinder;

wherein if the configurative structure is characterized by the shape of the combination including a truncated cone and plural axial fins projecting from the truncated cone at the truncated end of the truncated cone, then the truncated cone tapers in the aft axial-longitudinal direction, away from the aft axial-longitudinal end of the inertial dynamics measurement device;

wherein if the configurative structure is characterized by the shape of the combination including a truncated cone and a wheel having spokes projecting from the truncated cone at the truncated end of the truncated cone, then the truncated cone tapers in the aft axial-longitudinal direction, away from the aft axial-longitudinal end of the inertial dynamics measurement device.

2. The dynamic motion testing apparatus of claim 1 wherein the motion of the towed body includes marine navigation of the towed body, and wherein the inertial dynamics data pertaining to the towed body includes hydrodynamics data pertaining to the towed body during marine navigation of the towed body.

3. The dynamic motion testing apparatus of claim 1 wherein the inertial dynamics measurement device further includes an onboard computer for collecting the inertial dynamics data, and at least one communication device for transmitting the inertial dynamics data from the onboard computer to an off-board computer.

4. The dynamic motion testing apparatus of claim 3 wherein the at least one communication device includes at least one of a wired communication device and a wireless communication device.

5. The dynamic motion testing apparatus of claim 3 wherein the inertial dynamics measurement device further includes an at least substantially cylindrical housing, the inertial dynamics measurement device further comprising an onboard computer for collecting inertial measurement data, and at least one communication device for transmitting the inertial measurement data from the onboard computer to an off-board computer, the at least substantially cylindrical housing enclosing the inertial measurement unit, the onboard computer, and the at least one communication device.

6. The dynamic motion testing apparatus of claim 5 wherein the at least one communication device includes at least one of a wired communication device and a wireless communication device.

7. The dynamic motion testing apparatus of claim 1, wherein the apparatus comprises at least two separate differently shaped configurative structures for alternative attachment to the inertial dynamics measurement device, each configurative structure being capable of uniquely affecting the inertial dynamics of the towed body during motion of the towed body, the inertial measurement unit being capable of obtaining a set of inertial dynamics data corresponding to each configurative structure during motion of the towed body while the apparatus is coaxially coupled with the towed body.

8. The dynamic motion testing apparatus of claim 7 wherein:
the inertial dynamics measurement device includes an at least substantially cylindrical housing;
the apparatus comprises an onboard computer for collecting inertial measurement data, and at least one communication device for transmitting the inertial measurement data from the onboard computer to an off-board computer, the housing enclosing the inertial measurement unit, the onboard computer, and the at least one communication device.

9. A device for evaluating stability of a towed body in motion, the device comprising:
an inertial dynamics measurement component including an inertial measurement unit capable of sensing dynamic motions, a computer for generating data based on signals received from the inertial measurement unit, and a substantially cylindrical housing for enclosing said inertial measurement unit and said computer, said housing capable of coaxially connecting to and disconnecting from an elongate towed body at the trailing end of said towed body; and
a structural configuration variation component including at least two individually configured alternate structures, each said alternate structure capable of coaxially connecting to and disconnecting from said substantially cylindrical housing at the trailing end of said substantially cylindrical housing in the absence of any other said individually configured alternate structure;
wherein said at least two individually configured alternate structures are at least two different said individually configured alternate structures selected from the group consisting of:
a said individually configured alternate structure characterized by a cylindrical shape having an attachment cylindrical end and a nonattachment cylindrical end, said nonattachment cylindrical end characterized by a concave surface, wherein said coaxial connection of said individually configured alternate structure to said housing includes attachment of said individually configured alternate structure at said attachment cylindrical end so that said nonattachment cylindrical end is aft of said attachment cylindrical end;
a said individually configured alternate structure characterized by a shape describing a truncated cone and plural axial fins projecting from said truncated cone, wherein said truncated cone tapers aft;
a said individually configured alternate structure characterized by a shape describing a truncated cone and a wheel having spokes, said wheel situated coaxial with said truncated cone at the aft end of said truncated cone, wherein said truncated cone tapers aft.

10. The device for evaluating stability of claim 9 wherein the device comprises communication instrumentation for sending said data from said computer to a remote location, said substantially cylindrical housing enclosing said communication instrumentation.

11. The device for evaluating stability of claim 9 wherein each said alternate structure has its own said data associated therewith when said alternate structure is connected to said substantially cylindrical housing, said substantially cylindrical housing is connected to said towed body, and said towed body is in motion.

12. The device for evaluating stability of claim 11 wherein the device comprises communication instrumentation for sending said data from said computer to a remote location, said substantially cylindrical housing enclosing said communication instrumentation.

13. A method for testing dynamic motion of a towed body, the method comprising:
attaching an inertial dynamics measurement device to an elongate towed body at the aft longitudinal end of said elongate towed body, wherein said elongate towed body and said inertial dynamics measurement device are each characterized by a geometric axis, and wherein said attachment of said inertial dynamics measurement device to said elongate towed body is performed so that said elongate towed body and said inertial dynamics measurement device are at least substantially coaxial;
attaching a first configurative structure to said inertial dynamics measurement device at the aft longitudinal end of said inertial dynamics measurement device, wherein said first configurative structure is characterized by a geometric axis, and wherein said attachment of said first configurative structure to said inertial dynamics measurement device is performed so that said elongate towed body, said inertial dynamics measurement device, and said first configurative structure are at least substantially coaxial;
obtaining, using said inertial dynamics measurement device, a first set of inertial dynamics data, set first set of inertial dynamics data pertaining to said elongate towed body during motion of said elongate towed body while said inertial dynamics measurement device is attached to said elongate towed body and said first configurative structure is attached to said inertial dynamics measurement device;
detaching said first configurative structure from said inertial dynamics measurement device;
attaching a second configurative structure to said inertial dynamics measurement device at the aft longitudinal end of said inertial dynamics measurement device, wherein said second configurative structure is characterized by a geometric axis, and wherein said attachment of said second configurative structure to said inertial dynamics measurement device is performed so that said elongate towed body, said inertial dynamics measurement device, and said second configurative structure are at least substantially coaxial;
obtaining, using said inertial dynamics measurement device, a second set of inertial dynamics data, said second set of inertial dynamics data pertaining to said elongate towed body during motion of said elongate towed body while said inertial dynamics measurement device is attached to said elongate towed body and said second configurative structure is attached to said inertial dynamics measurement device;

comparing said first set of inertial dynamics data and said second set of inertial dynamics data.

14. The method for testing of claim 13 wherein the method further comprises collecting said inertial dynamics data using an on-board computer, and transmitting said inertial dynamics data from said onboard computer to an off-board computer using at least one of a wired communication device and a wireless communication device.

15. The dynamic motion testing apparatus of claim 1 wherein the configurative structure is characterized by the shape of the cylinder having an attachable axial-cylindrical end and a concave axial-cylindrical end.

16. The dynamic motion testing apparatus of claim 1 wherein the configurative structure is characterized by the shape of the combination including a truncated cone and plural axial fins projecting from the truncated cone.

17. The dynamic motion testing apparatus of claim 1 wherein the configurative structure is characterized by the shape of the combination including a truncated cone and a wheel having spokes projecting from the truncated cone at the truncated end of the truncated cone.

18. The method for testing of claim 13 wherein said first configurative structure and said second configurative structure are each one of the following types of configurative structure:

a first type of configurative structure, said first type of configurative structure including a nearly cylindrical element having a fore cylindrical end and an aft cylindrical end, said aft cylindrical end characterized by concavity;

a second type of configurative structure, said second type of configurative structure including a truncated conical element and axial fins projecting from said truncated conical element, said truncated conical element having a fore truncated conical end and an aft truncated conical end, said truncated conical element tapering toward said aft truncated conical end;

a third type of configurative structure, saide third type of configurative structure including a truncated conical element and a wheel, said truncated conical element having a fore truncated conical end and an aft truncated conical end, said truncated conical element tapering toward said aft truncated conical end, said wheel coaxially coupled with said truncated conical element at said aft truncated conical end.

19. The method for testing of claim 13 wherein said first configurative structure and said second configurative structure are the same type of configurative structure among the following types of configurative structure:

a first type of configurative structure, said first type of configurative structure including a nearly cylindrical element having a fore cylindrical end and an aft cylindrical end, said aft cylindrical end characterized by concavity;

a second type of configurative structure, said second type of configurative structure including a truncated conical element and axial fins projecting from said truncated conical element, said truncated conical element having a fore truncated conical end and an aft truncated conical end, said truncated conical element tapering toward said aft truncated conical end;

a third type of configurative structure, saide third type of configurative structure including a truncated conical element and a wheel, said truncated conical element having a fore truncated conical end and an aft truncated conical end, said truncated conical element tapering toward said aft truncated conical end, said wheel coaxially coupled with said truncated conical element at said aft truncated conical end.

20. The method for testing of claim 13 wherein said first configurative structure and said second configurative structure are different types of configurative structure among the following types of configurative structure:

a first type of configurative structure, said first type of configurative structure including a nearly cylindrical element having a fore cylindrical end and an aft cylindrical end, said aft cylindrical end characterized by concavity;

a second type of configurative structure, said second type of configurative structure including a truncated conical element and axial fins projecting from said truncated conical element, said truncated conical element having a fore truncated conical end and an aft truncated conical end, said truncated conical element tapering toward said aft truncated conical end;

a third type of configurative structure, said third type of configurative structure including a truncated conical element and a wheel, said truncated conical element having a fore truncated conical end and an aft truncated conical end, said truncated conical element tapering toward said aft truncated conical end, said wheel coaxially coupled with said truncated conical element at said aft truncated conical end.

* * * * *